United States Patent [19]

Chambers

[11] Patent Number: 4,960,288
[45] Date of Patent: Oct. 2, 1990

[54] MOUNTING FOR FIFTH WHEEL HITCH

[75] Inventor: James W. Chambers, Rockford, Ill.

[73] Assignee: Atwood Industries, Inc., Rockford, Ill.

[21] Appl. No.: 303,636

[22] Filed: Jan. 30, 1989

[51] Int. Cl.$^5$ ............................................. B62D 53/08
[52] U.S. Cl. .............................. 280/423.1; 280/418.1; 280/433; 280/901
[58] Field of Search ............... 280/415.1, 418.1, 406.2, 280/433, 434, 423.1, 901

[56] References Cited

U.S. PATENT DOCUMENTS

| | | | |
|---|---|---|---|
| 1,351,245 | 8/1920 | Hartwick | 280/434 |
| 1,929,220 | 10/1933 | Steinhower | 280/434 |
| 1,951,258 | 3/1934 | Retzlaff et al. | 280/434 X |
| 2,925,286 | 2/1960 | Hodges, Jr. et al. | 280/434 |
| 3,332,699 | 7/1967 | Devys | 280/415.1 X |
| 3,604,721 | 9/1971 | Hulverson | 280/418.1 X |
| 3,820,821 | 6/1974 | Leland | 280/433 X |
| 4,826,199 | 5/1989 | Chambers | 280/434 |

Primary Examiner—Charles A. Marmor
Assistant Examiner—Brian L. Johnson
Attorney, Agent, or Firm—Leydig, Voit & Mayer

[57] ABSTRACT

A fifth wheel hitch is attached releasably to the bed of a pickup truck by brackets which resemble the parts of a swinging door hinge and which are connected by removable pins. The hinge-type brackets with the removable pins enable the hitch to be quickly and easily removed from and re-installed in the truck.

4 Claims, 3 Drawing Sheets

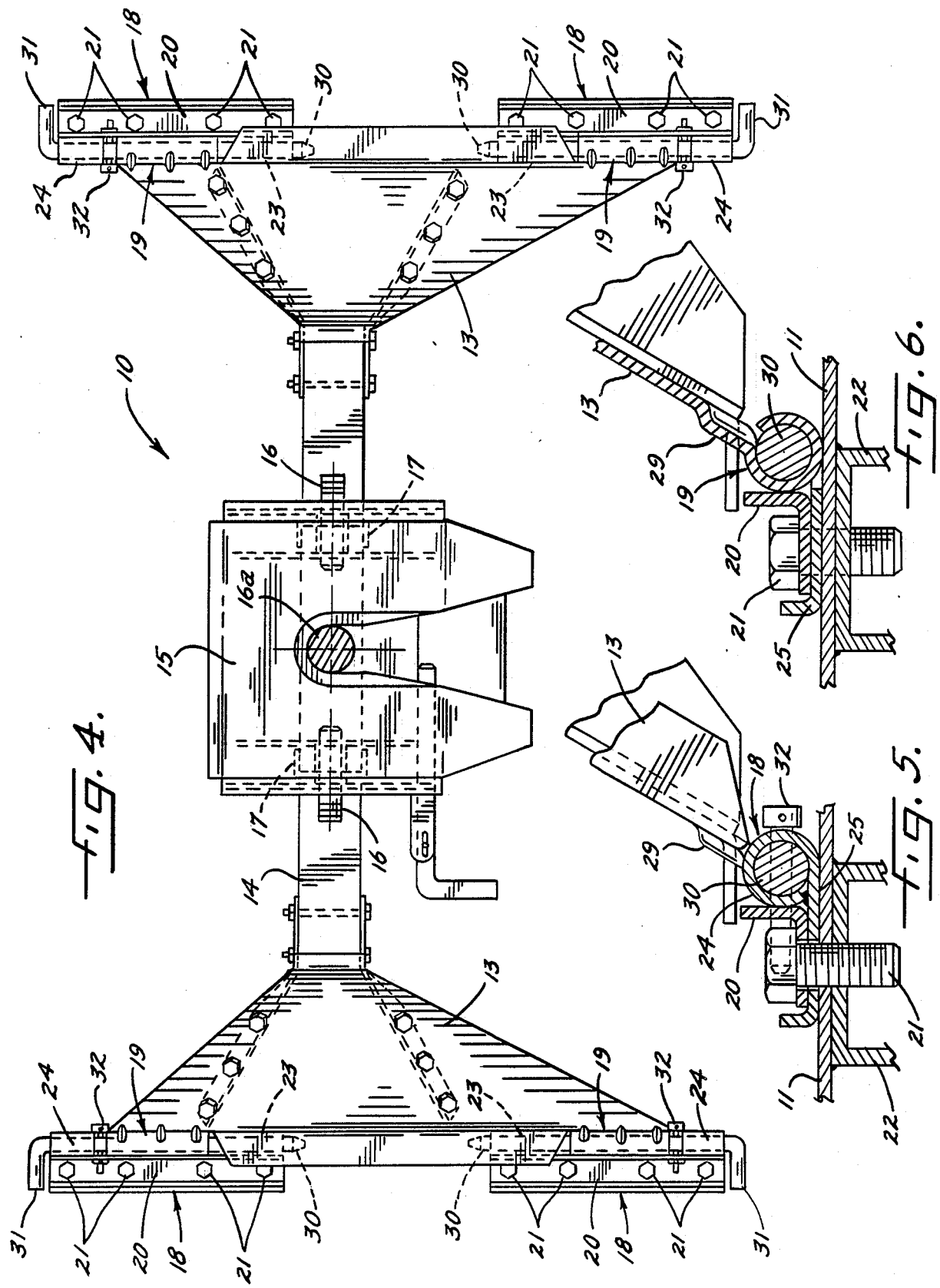

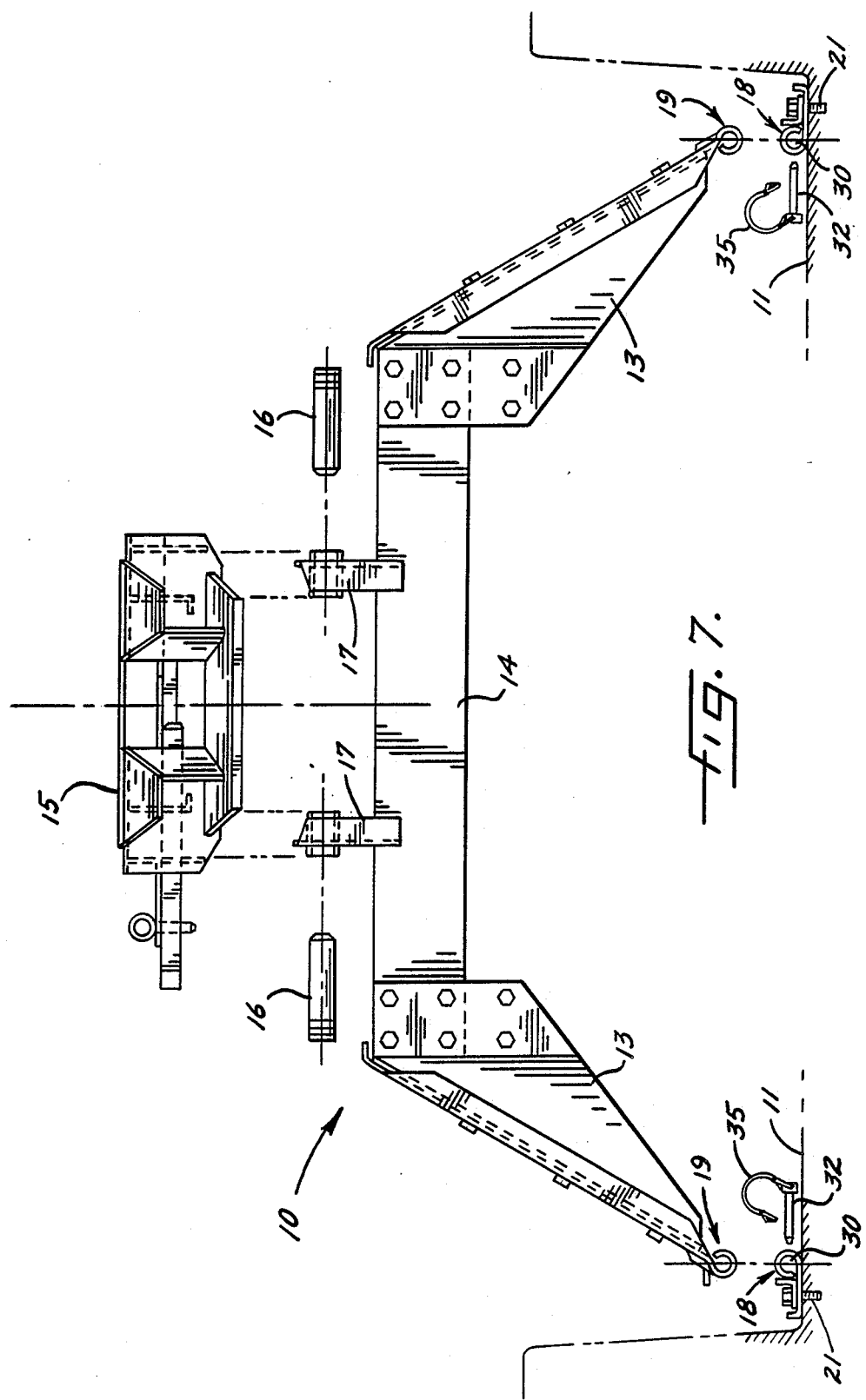

MOUNTING FOR FIFTH WHEEL HITCH

BACKGROUND OF THE INVENTION

This invention relates to a fifth wheel hitch of the type which is mounted in the bed of a pickup truck and which is adapted to be coupled to a recreational vehicle or other towed vehicle.

A major disadvantage of a fifth wheel hitch is that it occupies substantial space in the bed of the truck and significantly reduces the cargo capacity of the truck. It is, therefore, desirable to be able to remove the hitch from the bed when the hitch is not being used to tow a vehicle.

SUMMARY OF THE INVENTION

The general aim of the present invention is to provide a new and improved fifth wheel hitch having relatively simple and low cost means enabling the hitch to be quickly and easily removed from and re-installed in the bed of a truck.

A more detailed object of the invention is to achieve the foregoing through the provision of a fifth wheel hitch having mounting brackets which are generally in the form of hinge curls adapted to be quickly interleaved with and connected to similar brackets in the bed of the truck.

The invention also resides in the comparatively inexpensive construction of the mounting brackets for the hitch.

These and other objects and advantages of the invention will become more apparent from the following detailed description when taken in conjunction with the accompanying drawings.

BRIEF DESCRIPTION OF THE DRAWINGS

FIG. 4 is an enlarged top plan view of the hitch.

FIGS. 5 and 6 are enlarged fragmentary cross-sections taken substantially along the lines 5—5 and 6—6, respectively, of FIG. 2.

FIG. 7 is an exploded rear elevational view of the hitch.

DETAILED DESCRIPTION OF THE PREFERRED EMBODIMENT

Figure 1:
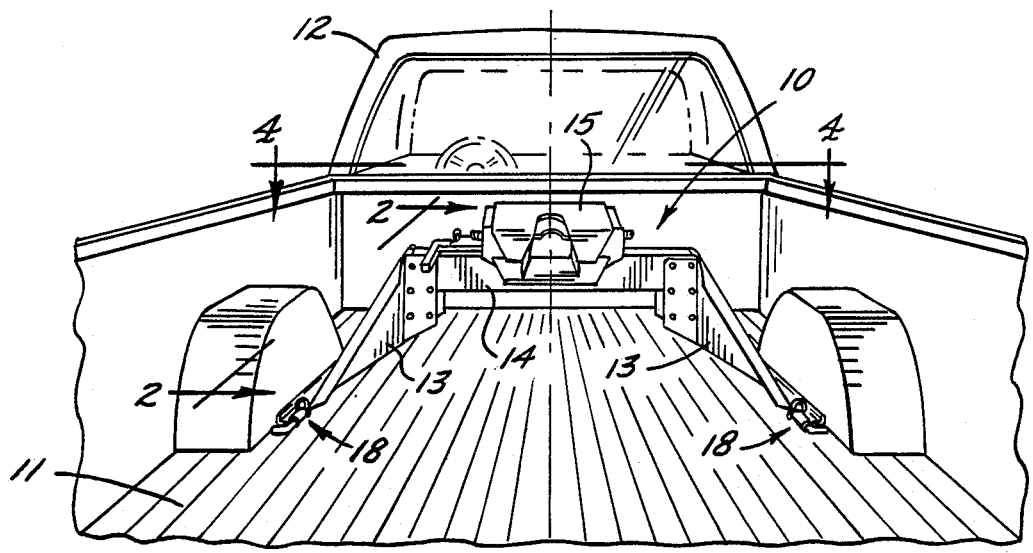
FIG. 1 is a fragmentary rear perspective view of a truck equipped with a new and improved fifth wheel hitch incorporating the unique features of the present invention.
Figure 2:
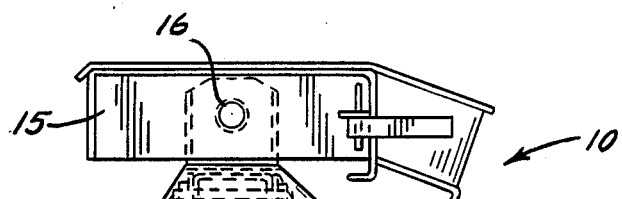
FIG. 2 is an enlarged side elevational view of the hitch as seen along the line 2—2 of FIG. 1.

As shown in the drawings for purposes of illustration, the invention is embodied in a hitch 10 of the type commonly referred to as a fifth wheel hitch. The hitch is mounted on the bed 11 of a pickup truck 12 and is used to couple the truck to a trailing vehicle (not shown) such as a recreational vehicle.

The hitch 10 is of the pedestal type and includes two laterally spaced legs 13 which extend upwardly from the bed 11. Each leg is made of sheet metal and is shaped generally as an inverted V.

Connected rigidly to and spanning the upper end portions of the legs 13 is a rather massive crossbar 14 which supports a coupler head 15 adapted to connect with the kingpin 16a (FIG. 4) of the trailing vehicle. The coupler head is attached releasably by pins 16 (FIG. 7) to a pair of mounting ears 17 which project upwardly from the crossbar. Reference may be made to Chambers U.S. Pat. No. 4,826,199 for a detailed disclosure of a coupler head generally similar to the coupler head 15.

As is apparent from FIG. 1, the hitch 10 occupies a significant amount of space in the truck 12 and reduces the cargo capacity of the truck. Since the hitch serves no purpose when no vehicle is being towed, it is advantageous to remove the hitch from the truck and free up the cargo space.

According to the present invention, the hitch 10 is removably attached to the bed 11 by pairs of brackets 18, 19 which interconnect with one another in the same manner as the hinge parts of a swinging door. As a result, the brackets 19 may be quickly disconnected from the brackets 18 to permit quick and easy removal of the hitch 10 from the truck 12.

More specifically, there are two sets of brackets 18 and 19 associated with each of the legs 13, one set of brackets being located at the front portion of each leg and another set of brackets being located at the rear portion of the leg. All of the sets of brackets are identical and thus a description of one set shall suffice for all.

Figure 3:
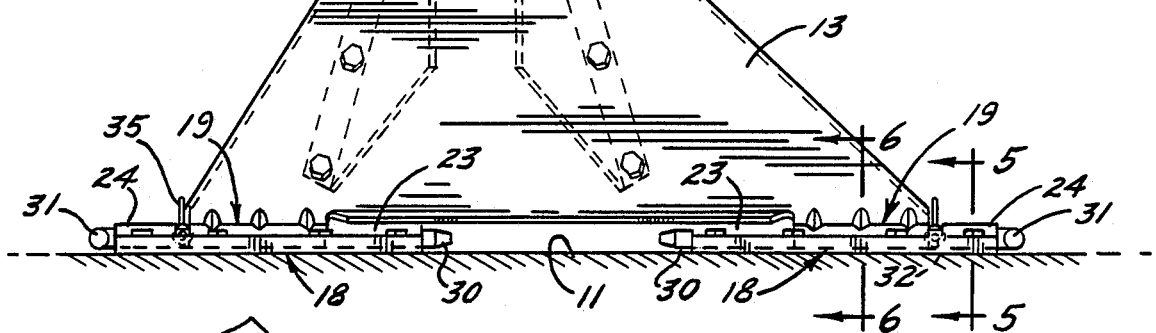
FIG. 3 is an enlarged exploded side elevational view of certain components of the hitch.
Figure 3:
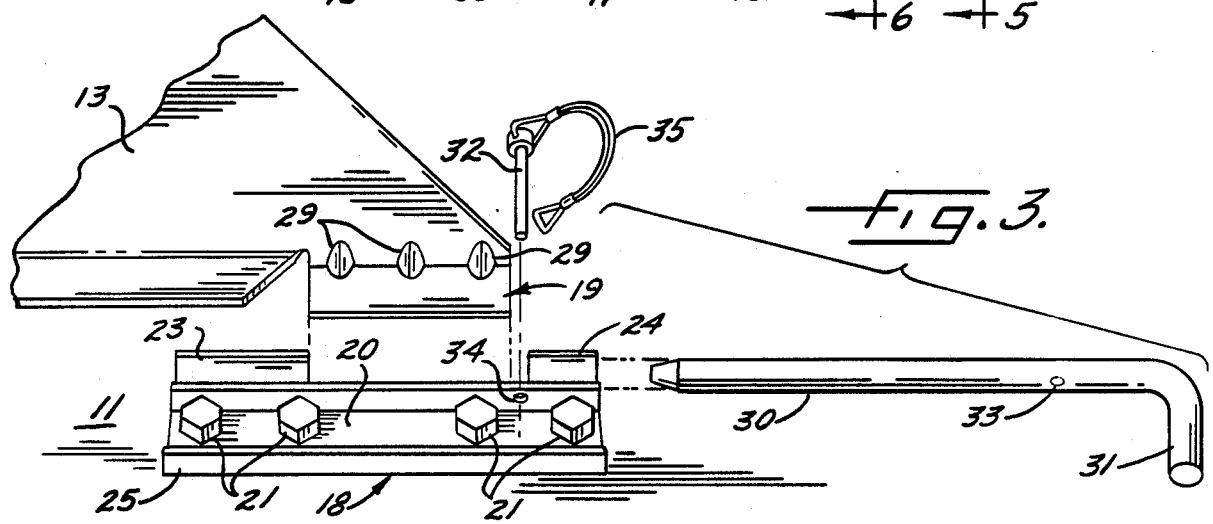

As shown in FIGS. 3 and 5, the bracket 18 of each set includes a fore-and-aft extending angle member 20 which is generally in the shape of an L. Screws 21 extend through the horizontal leg of the angle member and anchor the angle member to the bed 11, the screws preferably extending into a reinforcing channel 22 (FIG. 5) beneath the bed.

In carrying out the invention, two hinge-type curls 23 and 24 (FIG. 3) are located adjacent the inner side of the vertical leg of the angle member 20. The curls extend longitudinally of the bed 11 and are spaced longitudinally from one another. Formed integrally with each curl is an outwardly projecting plate 25 (FIG. 5). The plate is sandwiched between the bed 11 and the horizontal leg of the angle member 20 and is anchored by the screws 21.

The bracket 19 of each set is in the form of a curl (see FIGS. 3 and 6) which is integral with the lower edge of the associated leg 13. Stiffening gussets 29 (FIG. 3) near the lower end of the leg 13 serve to reinforce the curl 19. The curl 19 is of such length as to fit between and interleave with the curls 23 and 24 of the bracket 18.

A pin 30 (FIG. 3) is adapted to extend through the curls 19, 23 and 24 to hold the curl 19 in interleaving relation with the curls 23 and 24. A handle 31 is formed integrally with and projects outwardly from one end of the pin to facilitate installation and removal of the pin.

The hitch 10 is completed by a locking member in the form of a pin 32 (FIGS. 3 and 5) which releasably holds the pin 30 in place. As shown most clearly in FIG. 3, the pin 30 is formed with a radially extending hole 33 which, when the pin 30 is in its installed position, is aligned with a hole 34 in the vertical leg of the angle member 20. When the pin 30 is installed and the holes are aligned, the locking pin 32 may be inserted through the holes to prevent the pin 30 from shifting endwise within the curls 19, 23 and 24. A tether 35 on the head of the locking pin 32 may be secured to an appropriate part of the hitch 10 to guard against loss of the locking pin.

From the foregoing, it will be apparent that the present invention brings to the art a new and improved fifth wheel hitch 10 which is connected releasably to the truck bed 11 by hinge-type brackets 18 and 19 and by easily releasable pins 30. As a result of this mounting, the hitch may be removed from and reinstalled in the truck 12 in a comparatively fast and easy manner.

I claim:

1. A fifth wheel hitch adapted to be mounted in a bed of a pickup truck and adapted to be coupled releasably to a towed vehicle, said hitch comprising a pair of laterally spaced legs extending upwardly from said bed of said truck, said legs having upper and lower end portions, a supporting bar extending laterally between and fastened rigidly to the upper end portions of said legs, a coupler mounted on said supporting bar and adapted to be connected releasably to the tower vehicle, and means for releasably attaching said legs to said bed, said means comprising first brackets connected rigidly to the lower end portions of said legs, second brackets located adjacent said first brackets, each of said second brackets being connected rigidly to said bed and each including an outwardly projecting plate and an angle member with a vertical leg, hinge curls on said first and second brackets and extending longitudinally of said bed, said vertical leg abutting said hinge curls and extending substantially coextensively therewith, the curls on each first bracket and each adjacent second bracket interleaving with one another and forming a set of interleaved curls, each set of interleaved curls including two longitudinally spaced curls on one of said brackets and further including an intermediate curl on the other of said brackets and filling substantially all of the longitudinal space between said spaced curls, a pin extending through each set of interleaved curls to connect each first bracket releasably to the adjacent second bracket, and means holding each pin in the associated set of curls and selectively releasable to permit removal of said pin and thereby enable said hitch to be removed from said truck.

2. A fifth wheel hitch as defined in claim 1 in which each of said second brackets includes a pair of longitudinally spaced curls formed on the outwardly projecting plate of the second bracket, each of said first brackets having a curl sized to fit between and interleave with the curls of the adjacent second bracket and where said angle member is L-shaped, is substantially coextensive with the interleaved hinge curls, and sandwiches said outwardly projecting plate to the bed.

3. A fifth wheel hitch as defined claim 4 in which said holding means comprise a radially extending hole in each of said pins and a hole in each of said second brackets, the hole in each pin being aligned with the hole in the adjacent bracket when said hitch is installed in said truck, and a locking member extending releasably into each pair of aligned holes to prevent removal of the associated pin from said curls and where said angle member is L-shaped, is substantially coextensive with the interleaved hinge curls, and sandwiches said outwardly projecting plate to the bed.

4. A fifth wheel hitch adapted to be mounted in a bed of a pickup truck and adapted to be coupled releasably to a towed vehicle, said hitch comprising a pair of laterally spaced legs extending upwardly from said bed of said truck, said legs having upper and lower end portions, a supporting bar extending laterally between and fastened rigidly to the upper end portions of said legs, a coupler mounted on said supporting bar and adapted to be connected releasably to the towed vehicle, and means for releasably attaching said legs to said bed, said means comprising first brackets connected rigidly to the lower end portions of said legs, second brackets located adjacent said first brackets, each of said second brackets being connected rigidly to said bed and each including an outwardly projecting plate and an angle member with a vertical leg, hinge curls on said first and second brackets and extending longitudinally of said bed, said vertical leg abutting said hinge curls and extending substantially coextensively therewith, the curls on each first bracket and each adjacent second bracket interleaving with one another and forming a set of interleaved curls, a pin extending through each set of interleaved curls to connect each first bracket releasably to the adjacent second bracket, and means normally holding each pin in the associated set of curls and selectively releasably to permit removal of said pin and thereby enable said hitch to be removed from said truck, said holding means normally preventing any substantial relative longitudinal movement between the curls of the associated set.

* * * * *